United States Patent Office 3,387,060
Patented June 4, 1968

3,387,060
POLYESTERS PREPARED FROM MALEIC ANHYDRIDE AND 2,2,4,4 - TETRACHLORO - 1,5-DIHYDROXY-3-PENTANONE
Michael Kokorudz and William K. Langdon, Grosse Ile, Mich., assignors to Wyandotte Chemicals Corporation, Wyandotte, Mich., a corporation of Michigan
No Drawing. Filed May 4, 1966, Ser. No. 547,440
18 Claims. (Cl. 260—869)

ABSTRACT OF THE DISCLOSURE

This invention relates to flame retardant polyesters prepared from maleic anhydride, one or more additional dicarboxylic acids and anhydrides, and 2,2,4,4-tetrachloro-1,5-dihydroxy-3-pentanone having the formula $$HOCH_2-CCl_2-CO-CCl_2-CH_2OH$$

The polyesters can be cross linked with unsaturated monomers to obtain hard resins.

---

The present invention relates to polyesters and is more particularly concerned with halogenous polyesters having increased chemical and fire resistance.

The commercial potentialities of polyesters and related polymeric materials based on polyesters were recognized during the 1930's and especially during the Second World War. The ultrahigh strength properties of many of these compositions, combined with their light weight and durability, made them successful competitors in many applications with more conventional structural materials such as steel and aluminum. Polyester-based materials proved to be especially valuable. It was found that polyesters containing ethylenic unsaturation could be successfully copolymerized with unsaturated monomers to give hard, durable plastics, with wide variations in properties possible by varying the proportions and identity of the initial reactants. Such polyesters could be applied on a surface and air-dried to give tough, elastic, weather-resistant coatings. They could also be applied to reinforcing material, such as glass fiber, to give strong structural materials. When polyesters were used as intermediates with compounds containing functional groups capable of reacting with hydroxy or carboxy groups of the polyester, for instance isocyanates, a wide variety of products could be obtained ranging from soft and flexible to hard and brittle plastics, elastomers, and foams.

However, in spite of the excellent physical and chemical properties of such polyester-based compositions, it was also found that they possess a major disadvantage, and consequently, a factor which limits the area of their potential use: they are flammable and burn readily. Safety requirements, as imposed by insurance underwriters and civic ordinances, dictate that materials more resistant to fire be used.

It is a purpose of this invention to provide a new and useful class of halogenous polyesters which tend to polymerize completely, exhibit improved thermal properties, which are prepared from commercially available materials, which are relatively inexpensive, and which are useful as intermediates in the preparation of polymeric compositions which have a relatively high order of nonflammability, which in many cases are nonburning and which compositions may be cross-linked.

It has been found that the foregoing and additional purposes are accomplished by reacting either maleic anhydride or combinations of maleic anhydride and one or more additional dicarboxylic compounds selected from the group consisting of dicarboxylic acids and anhydrides with 2,2,4,4-tetrachloro - 1,5 - dihydroxy-3-pentanone, the latter product having the formula:

$$HOCH_2-CCl-CO-CCl_2-CH_2OH$$

Preparation of the latter product is disclosed in our copending patent application Ser. No. 545,571 filed Apr. 27, 1966.

Essentially, the dibasic anhydride reacts with the above diol to give a polymer chain comprising alternating dicarboxy and 2,2,4,4-tetrachloro-1,5-dihydroxy - 3 - pentanone units.

These polyesters can be cross-linked with unsaturated monomers to give hard plastics which have physical properties comparable or superior to those of commercially available polyester plastics, superior chemical stability as compared with many commercial polyester plastics, and which are often nonburning. These are thermally stable, halogen-containing compounds which are prepared from commercially available, relatively inexpensive materials, are less sensitive to gelation than the prior art compounds, and which can be molded alone or with reinforcing materials to give hard, durable plastics.

The reaction may be carried out by merely heating and reacting the maleic anhydride with or without additional dicarboxylic acid compounds with the 2,2,4,4-tetrachloro-1,5-dihydroxy-3-pentanone.

To start the reaction, generally the mixture must be externally heated to above about 80° C. at which point a mild exotherm occurs. The operation is preferably carried out at substantially atmospheric pressure although elevated pressure may be employed if desired.

In the reaction of this invention, it is essential to employ maleic anhydride. Useful products may also be obtained wherein maleic anhydride is mixed with other dicarboxylic organic acids or anhydrides, preferably those containing up to and including 12 carbon atoms.

Representative examples of the unsaturated dicarboxylic acid anhydrides which may be employed are chloromaleic anhydride, itaconic anhydride, citraconic anhydride, and the like. Examples representing the saturated dicarboxylic anhydrides are malonic anhydride, succinic anhydride, glutaric anhydride, adipic anhydride, phthalic anhydride, tetrahydrophthalic anhydride, hexachloroendomethylene tetrahydrophthalic anhydride, etc. Also, anhydrides of polycarboxylic acids can be utilized, like e.g., pyromellitic anhydride. Dicarboxylic acid anhydrides with and without olefinic unsaturation can be employed mixed in any proportion with the maleic anhydride. However, a certain minimum proportion of unsaturated dicarboxylic acid anhydrides is necessary to provide sufficient unsaturated sites in case subsequent cross-linking with a vinyl monomer is desired. At least 40 percent and preferably 60 percent unsaturated dicarboxylic acid anhydrides is considered as the minimum proportion for such use.

In the preparation of the polyesters in the present invention, it is possible to vary the proportions of 2,2,4,4-tetrachloro-1,5 - dihydroxy-3-pentanone to dicarboxy compound or compounds over a substantial range. The polyesters so formed are of somwhat varied character. The proportions control the chemical and physical properties of the polyester, such as consistency, color, molecular weight, hydroxyl content, and halogen content, as well as the properties of a cured polyester prepared therefrom such as heat distortion temperature. Accordingly, the preferred range in an individual case depends on a number of factors, including the intended use of the polyester, properties desired in both the polyester itself and in compositions based on the polyester, the use of maleic anhydride alone or a combination of maleic anhydride with one or more other dicarboxylic acids and anhydrides and on the exact dicarboxylic acids or anhydrides mixed with the maleic anhydride. In general, it is preferred to employ equimolar amounts of the 2,2,4,4-tetrachloro-1,5-dihydroxy-3-pentanone and dicarboxylic acid anhydride component. However, this proportion can be varied between about 6:1 and 1:2.

The polyester compounds of the present invention are soluble in most organic polar and nonpolar solvents with the notable exception, in most cases, of diethylether and water, as well as in many monomers including styrene, butyl methacrylate, triallylisocyanurate, diallylphthalate, etc. The polyesters have been found to be compatible in nearly any ratio with standard polyester resins. Because of these solubilities, it is frequently convenient to mix the polyester with further reactants and/or standard polyesters with which they are to be reacted or coreacted, as in the case of unsaturated polyesters which are to be cross-linked, and store the resulting mixtures until needed for use.

The molecular weights of the polyesters produced according to the present invention range from that of the reaction product of one dicarboxy compound molecule with one oxide molecule and one alcohol molecule, generally around 200, but depending, of course, on the individual reactants to more than 10,000.

As stated above, the products produced in accordance with the present invention may be beneficially used for a variety of purposes, including use in the preparation of alkyd-type resins and most applications where commercial polyesters are currently being used but giving products with superior fire and chemical resistance. They range from liquids to rubbery elastomers to hard, strong plastics. These products can be used for a variety of purposes in such diversified fields as adhesives, coatings, and the like. Otherwise the products may be used to impart beneficial characteristics to alkyd resins, in coating compositions and laminates of various types, and the like.

The above-described polyesters of this invention can be cross-linked with various ethylenically unsaturated cross-linking agents to yield materials useful in a wide variety of application including flexible and rigid coatings, elastomers, rubbers, soft-to-hard plastics, etc., all having a high degree of nonflammability and chemical resistance and, in many cases, even being nonburning. The conditions for cross-linking are, in general, conventional for the cross-liking of any unsaturated polymer with an unsaturated cross-linking agent. The ethylenically unsaturated cross-linking agents which may be employed are materials containing at least one reactable ethylenically unsaturated group. These materials include polymerizable ethylenically unsaturated monomers, such as styrene, vinyltoluene, alpha-methyl styrene, chlorostyrene, fluorostyrene, trifluoromethylstyrene, dichlorostyrene, divinylbenzene, butadiene, diallylphthalate, triallylisocyanate, acrylic acid; the alkyl acrylates and methacrylates, including methyl methacrylate, ethyl methacrylate, butyl methacrylate, etc.; lower-alkyl esters of maleic and fumaric acid, acrylonitrile, vinylidene cyanide, vinyl pyridine, vinyl pyrrolidone, vinyl carbazole, vinyl ketones such as vinyl butyl ketone, etc.; drying oils, including linseed oil, perilla oil, poppy oil, etc.; as well as polymeric ethylenically unsaturated cross-linking agents, such as, for example, natural and synthetic rubbers, e.g., the isoprene rubbers, butadiene rubbers, styrene-butadiente rubbers, vinyl polymers, etc., and the like. The cross-linking agent selected in a particular instance depends on numerous factors; such as, among others, the properties desired in the final product, the cost and availability of the cross-linking agent, and the properties (especially degree of unsaturation) of the cross-linking agent itself, and for different applications different cross-linking agents may be chosen, although in every case those capable of free-radical initiation are preferred. Obviously, a wide latitude is possible in selection of the cross-linking agent, and it may even involve the use of combinations of two or more cross-linking agents. By way of example, styrene is frequently used due to its favorable cost, compatibility and reactivity, as well as the excellent physical properties it provides in the final cross-linked product. However, by including a small amount of a different cross-linking agent, for example, an alkyl methacrylate, e.g., butyl methacrylate, the weathering characteristics and optical properties of the plastic may be improved. By cross-linking the polyester with a compound which is more highly functional than styrene, such as diallylphthalate, divinylbenzene, or triallylisocyanurate, many of the physical and chemical properties of the plastic can be improved, for example, resistance to embrittlement and creasing in organic solvents such as acetone or ethylene dichloride, heat resistance, etc. Generally, the greater the functionality of the cross-linking agent, the greater the chemical and heat resistance of the cross-linked polymer.

The amount of cross-linking agent used in cross-linking the starting halogenous unsaturated polyester to prepare the compositions of the present invention depends to a considerable extent on the particular cross-linking agent and polyester employed, as well as the chemical and physical properties desired in the final product. The amount used can vary over a considerable range. As little as 20 percent of cross-linking agent by weight of the polyester can be used to prepare a hard, durable plastic having a high resistance to combustion. On the other hand, by increasing the amount of cross-linking agent to as much as 40–70 percent by weight, plastics can be obtained which are more flexible and less hard. In general, the greater the proportion of cross-linking agent, the less hard and more flexible the product. The usual amount of cross-linking agent is about 30–50 percent by weight but, if desired, more or less may be used and even excesses of cross-linking agent over poylester. The optimum amount of cross-linking agent depends upon the characteristics desired in the product. Preferred ranges are ordinarily between about 30 and 40 percent by weight of polyester.

The cross-linking agents generally exhibit good compatibility with the ethylenically unsaturated halogenous polyesters, and therefore may ordinarily be mixed with the starting polyester with or without the aid of plasticizers and at any time prior to the final cross-linking reaction step. The polyester may, for example, be mixed with the desired cross-linking agent to give a polyester resin and cross-linking agent mixture which can be stored until use and shipped in any convenient form, such as solid, granular, or powder form, and in any convenient quantity. Or, the cross-linking agent (or additional cross-linking agent) may be mixed with the polyester at any other time prior to the actual step of cross-linking. Cross-linkage is simply effected by exposing the mixture of the polyester and cross-linking agent to favorable reaction conditions. These conditions involve the use of a vinyl polymerization initiator, preferably a chemical initiator of the free-radical type. Any established vinyl polymerization initiator may be employed. Examples of these polymerization initiators are the peroxides, representatively benzoyl peroxide, methylethylketone peroxide, acetyl peroxide, hexachloroacetyl peroxide, succinic acid peroxide, di-tertiary-butyl peroxide, di-tertiary-butyl hydroperoxide, cumene hydroperoxide, alpha,alpha'-azo-diisobutyronitrile, etc. Other initiators which may be used to initiate the cross-linking include heat, electromagnetic radiation, dielectric heating, irradiation, etc., as well as combinations thereof and combinations with chemical initiators. The primary consideration in selecting a polymerization initiator is the temperature at which the cross-linking or curing process is desired to be carried out and the rate necessary to achieve a satisfactory gelled system. As usual, under the same reaction conditions some initiators will effect complete reaction while others will effect a relatively incomplete reaction. Selection of the particular reaction initiator will, of course, be made with these factors in mind as well as the characteristics desired in the final product.

The optimum time and temperature for curing of a particular polyester-cross-linking agent composition depends on various factors in addition to the reactants employed in preparation of the polyester and cross-linking of the same. The strength and many other of the chemical and physical properties of the cross-linked resin depend on the degree of cure and the temperature at which the cure is effected and for a given resin cured at a specific temperature, the tensile strength of the final product appears to increase with the degree of cure. Ordinarily, temperatures of about 60° C. are satisfactory, although higher or lower temperature ranges can be used if desired. Lower temperatures generally require a longer curing time for a given degree of cure, while higher temperatures require a shorter time. Of course, the length of the treatment is governed by the degree of cure desired. Generally, 6 to 20 hours is sufficient to effect a normal cure although a shorter or longer period may be used, as in special cases with certain extremely active initiators or accelerators, in which case the curing peroid for the particular system can be considerably shortened. It is sometimes also desirable to vary conditions during the cure as, for example, by curing at one temperature followed by a post cure at the same or a different temperature.

It is also within the contemplation of the present invention to use more than one halogenous polyester, or to supplement the described starting halogenous polyesters with other polyesters such as standard commercially available polyesters. These additional polyesters also contain ethylenic unsaturation. Such polyesters include standard halogenous or nonhalogenous polyesters based on maleic or fumaric acids or anhydrides, as well as those based on other ethylenically unsaturated polybasic acids or anhydrides, and polyesters prepared from mixtures of ethylenically unsaturated acids or anhydrides with acids or anhydrides free from other than aromatic unsaturation, such as phthalic acid, hexachloroendomethylene tetrahydrophthalic acid, adipic acid, etc. These and other polyesters are known in the art and may be obtained commercially or be prepared by any of the standard procedures for preparing such polyesters. In order to obtain satisfactory fire-resistant properties in the cross-linked product, it is recommended that nonhalogenous polyesters not exceed 25 percent by weight of the mixture of the polyesters. The polyesters are compatible before the cross-linking step and the procedure employed is to admix the starting polyesters when more than one is used and then cross-link the mixture.

The properties of the cross-linked polyester can also be varied by incorporating plasticizers into the composition either chemically or physically. These plasticizers include, among others, polyfunctional compounds capable of reacting with free hydroxy or carboxy groups of the polyester, as well as vinyl plasticizers such as dioctyl phthalate, octyl cresyl phosphate, dibutyl phthalate, other alkyl and alkoxyalkyl ethers of dicarboxylic acids, saturated polyesters, etc. The resins of this invention can also be modified by the addition of pigments, fillers, stabilizers, lubricants, etc., with detracting from the benefits of the invention.

It is possible to improve the over-all color of the plastic by adding a small amount of an antioxidant during some stage of its preparation, advantageously the final cross-linking stage. Many such agents are known, such as cadmium and barium soaps, tin compounds such as the octanoate, etc. Of the antioxidants the phosphites are preferred, representative examples being dimethyl phosphite and triphenyl phosphite. In addition to improving the color of the finished product, the phosphites often impart further fireproofing characteristics to the system.

The cross-linked resins of the present invention are prepared by mixing the polyester and cross-linking agent and casting, molding, or applying the mixture in some convenient manner to a mold, form, or surface, etc., and curing the mixture, generally by adding a chemical vinyl polymerization initiator and heating the mixture until the desired degree of cure is achieved. The resulting products have a wide variety of properties, as discussed hereinbefore, and are characterized by an order of nonflammability superior to that of presently known cross-linked polyester resins. They have chemical resistance comparable and even superior to that of standard polyester plastics presently available. In addition, the cross-linked polyester compositions generally have favorable moisture absorption properties.

The cross-linked polyester resins of the invention may be advantageously utilized as elastomers in such diversified fields as shoes, rubber tires, gears and gaskets, elastic threads, elastomer-coated fabrics, adhesives, as well as many others. They may be used to prepare tough, flexible-to-rigid thermosetting coatings. One preferred class of such coatings is prepared using a drying oil such as linseed, perilla, or poppy oil, etc., as cross-linking agent. Such coatings are prepared by mixing the halogenous polyester and drying oil and applying the resulting mixture to a surface, such as by dipping, brushing, knife coating, roller coating, spraying, etc., and heating the resulting film at an elevated temperature for a time sufficient to cure the film and produce a tough resistant coating which exhibits good fire and chemical resistance. Alternatively, the film may be allowed to air-dry or otherwise caused to undergo oxidative cross-linking to give tough, elastic, weather and chemical resistant films having improved fire resistance.

Hard polyester plastics can also be prepared according to the present invention and are especially useful where plastics having improved fire resistance are of interest. These plastics can be used alone, or they can be reinforced with strands or fibers of synthetic or natural materials including glass fibers, nylon, cotton, sisal, asbestos, cellulose, as well as many others, in any convenient form such as fabric, mats, yarn, chopped or continuous roving form, etc. Some strength increase can also be achieved by using certain nonfibrous materials, such as carbon, wood and pigment fillers, etc. Such reinforcing material can be included in the composition in any convenient manner, such as by mixing the composition with the reinforcing material or vice versa, prior to, at the same time, or after applying the resin mixture to the desired mold, form, or surface, etc., or the resin mixture may be applied directly to the reinforcing material, as when fabrics, sheets, or mats are being used. The resin mixture and reinforcing material may also be combined in situ and cured. Such procedures and techniques known and used in the art and which typify these and other possible variations include hand lay-ups, spray-ups, preforms, premixes, prepegs, and filament winding, as well as numerous others. Such reinforced or filled resins, as well as the resins without reinforcing materials, are useful in a variety of construction, structural, and manufacturing applications wherein strong, durable plastics can be employed as, for example, resin-rigidized substrates, laminates, filled and unfilled plastics, in situ cured plastics, etc., and including applications where similar cross-linked polyester resins are now being used, and especially where increased fire resistance and/or chemical resistance of the compositions of the invention are of value. Innumerable other uses and applications of the cross-linked compositions of the present invention exist and will be readily appreciated by one skilled in the art. The preferred halogen content by weight in the cross-linked polyesters of the invention is between about 10 and 40 percent.

TEST PROCEDURES

Several general procedures can be used in testing the polyester products of the present invention.

The hardness of the cast polyester is determined by using a Barcol impressor, manufactured by Barber-Colman, Rockford, Ill., a portable spring-loaded instrument originally designed to distinguish various alloys of aluminum. The indenter is a truncated cone with a 26-degree angle and a flat tip 0.0062 inch in diameter. The scale reads from 0 to 100 direct hardness.

The tensile properties, particularly tensile strength, are determined by ASTM D–638 test procedure and are measured on the "Instron," manufactured by Instron Engineering Corporation. A sample, 8.5 inches by 0.5 inch by less than 0.25 inch, is pulled at a very slow rate until the sample ruptures. The force in pounds per square inch required to break the sample is measured, as well as length of sample, etc.

The flexural properties are determined by ASTM D–790 test procedure, which involves bending a standard bar of the plastic, having a rectangular cross-section and supported at both ends in the manner of a simple beam, by applying a load at its midpoint. The sample is deflected until rupture occurs or until the maximum fiber strain of 5 percent is reached. The flexural modulus can be measured by drawing a line tangent to the slope of the stress-strain curve at the origin.

Water absorption is determined by ASTM D–570 test procedure and is the percent water absorbed by a 3-inch by 1-inch by less than 0.25-inch sample during the duration of the test. The increase in weight is measured and expressed as a percentage.

The heat distortion test, ASTM D–648–56, determines the temperature at which an arbitrary deformation occurs when the specimen is subjected to an arbitrary set of test conditions. A bar (0.5 by 0.5 by 5 inches) of test material is subjected to a load of 264 p.s.i. and the temperature is increased at the rate of 2° C. per minute. The temperature at which the bar has deflected 0.010 inch is reported as the heat distortion temperature. Mineral oil is the usual immersion liquid.

The practice of this invention will be more completely understood by reference to the following examples.

Example I

In a one-liter, round-bottom flask equipped with a mechanical stirrer, thermometer, and heating mantle, 98 grams (1 mole) of maleic anhydride and 256 grams (1 mole) of 2,2,4,4-tetrachloro-1,5-dihydroxy-3-pentanone were charged and the mixture heated to about 100° C. to initiate the reaction. This required about 15 minutes. The mixture was then allowed to exotherm whereupon the temperature rose to 108° C. The mixture was heated to 120° C. and the reaction proceeded for 30 minutes.

200 milliliters of perchloroethylene solvent and 1 milliliter of concentrated sulfuric acid catalyst were added and the mixture heated to reflux temperature. At the beginning of reflux, the temperature in the pot was 123° C. and at the head of the reflux column it was 115° C. The water of esterification was then removed by azeotropic distillation with the perchloroethylene solvent, a total of 19 milliliters of a water layer being removed over a period of 4 hours with a pot temperature of between 115° C. and 124° C.

After completion of the azeotropic distillation, the mixture was stripped of 250 milliliters of tetrachloroethylene. 250 milliliters of acetone were then added with stirring, the sulfuric acid was neutralized with sodium bicarbonate, and the product filtered. The solvents and any low-boiling components were then stripped at a final temperature of 120° C. and 2 milliliters of mercury pressure. The residue was a dark, viscous liquid which became solid upon standing and which weighed 313 grams. The theoretical weight was 336 grams.

A quantity of this product (250 grams) was mixed with 170 grams of styrene to give a mixture containing 40 percent styrene. 4.2 grams of benzoyl peroxide were added and a plate was cast. Cure was effected by heating overnight at 60° C., followed by a post cure at 100° C. for 6 hours. This product showed the following physical properties:

| | |
|---|---|
| Tensile strength _____ p.s.i__ | 6400 |
| Flexural strength _____ p.s.i__ | 10,226 |
| Heat distortion temperature, ° C. _____ | 94 |
| Hardness (Barcol) _____ | 42 |
| Water absorption: | |
|     4 hrs./100° C. _____ | 1.57 |
|     24 hrs./room temp. _____ | 0.15 |

Example II

In a three-liter, three-neck, round-bottom flask equipped with a mechanical stirrer, thermometer, and heating mantle, 1064 grams (4 moles) of 2,2,4,4-tetrachloro-1,5-dihydroxy-3-pentanone, 400 milliliters of a ½ carbon tetrachloride-½-tetrachloroethylene solvent mixture were charged and the mixture heated to reflux, i.e., 110° C. whereby 36 milliliters of water were removed. 392 grams (4 moles) of maleic anhydride and 5 milliliters of concentrated sulfuric acid were then added and the mixture heated and refluxed for 6¼ hours. The pot temperature of the mixture ranged from 103° C. to 123° C. during this period and 46 milliliters of water were removed by azeotropic distillation. An additional 5 milliliters of concentrated sulfuric acid were added during this second refluxing step.

After completion of the azeotropic distillation, the mixture was stripped of the solvents at a temperature ranging from 30° C. to 110° C. at 2 millimeters of mercury pressure. The residue was a dark, viscous liquid which became solid upon standing.

A quantity of this product (300 grams) was mixed with 300 grams of styrene to give a mixture containing 50 percent styrene. 3 grams of benzoyl peroxide were added and a plate was cast. Cure was effected by heating overnight at 60° C., followed by a post cure at 100° C. for 6 hours. This product showed the following physical properties:

| | |
|---|---|
| Tensile strength _____ p.s.i__ | 6721 |
| Flexural strength _____ p.s.i__ | 15,455 |
| Heat distortion temperature, ° C. _____ | 92 |
| Hardness (Barcol) _____ | 36 |
| Water absorption: | |
|     4 hrs./100° C. _____ | 0.91 |
|     24 hrs./23° C. _____ | 0.10 |

Example III

In a one-liter, three-neck, round-bottom flask equipped with a mechanical stirrer, thermometer, and heating mantle, 1064 grams (4 moles) of 2,2,4,4-tetrachloro-1,5-dihydroxy-3-pentanone, 392 grams (4 moles) of maleic anhydride, 200 milliliters of tetrachloroethylene and 200 milliliters of carbon tetrachloride were charged and the mixture heated to reflux at 87° C. which required a period of about 1 hour. 5 milliliters of concentrated sulfuric acid catalyst were then added and the reflux continued for an additional 2½ hours with the temperature gradually increasing to 106° C. 108 milliliters of water were removed during reflux. The mixture was cooled to 20° C. and 200 milliliters of perchloroethylene and 50 grams of sodium bicarbonate were then added and the mixture stirred for 30 minutes and filtered. The solvents and low-boiling components were then stripped at 2 millimeters of mercury pressure, the final temperature being 110° C. The residue was a dark, viscous liquid which became solid upon standing and which weighed 1284 grams. The theoretical amount is 1378 grams and thus the yield was 95.2 percent.

A quantity of this product (360 grams) was mixed with 240 grams of styrene to give a mixture containing 40 percent styrene. 3 grams of benzoyl peroxide were added and a plate was cast. Cure was effected by heating overnight at 60° C., followed by a post cure at 100° C. for 6 hours. This product showed the following physical properties:

| | |
|---|---|
| Tensile strength _____ p.s.i__ | 7518 |
| Flexural strength _____ p.s.i__ | 15,660 |
| Heat distortion temperature, ° C. _____ | 92 |
| Hardness (Barcol) _____ | 36 |
| Water absorption: | |
| 4 hrs./100° C. _____ | 0.91 |
| 24 hrs./23° C. _____ | 0.10 |

Example IV

In a three-liter, three-neck, round-bottom flask equipped with a mechanical stirrer, thermometer, and heating mantle, 1195 grams (3 moles) of 2,2,4,4-tetrachloro-1,5-dihydroxy-3-pentanone, 294 grams (3 moles) of maleic anhydride, 150 milliliters of carbon tetrachloride and 150 milliliters of perchloroethylene were charged and the mixture heated to reflux at 87° C. which required a period of 1½ hours. 5 milliliters of concentrated sulfuric acid catalyst were then added and the reflux continued for an additional 10½ hours with the temperature gradually increasing to 100° C. 90 milliliters of water were removed during reflux. The mixture was cooled to room temperature and 200 milliliters of perchloroethylene and 50 grams of sodium bicarbonate were then added to the mixture which was then heated to 60° C. and filtered. The solvents and low-boiling components were then stripped at 3 millimeters of mercury pressure and 120° C. to 125° C. The residue was a light-colored, viscous liquid which became solid upon standing and which weighed 928 grams. The theoretical amount is 1007 grams and thus the yield was 92 percent.

A quantity of this product (300 grams) was mixed with 300 grams of styrene to give a mixture containing 50 percent styrene. 3 grams of benzoyl peroxide were added and a plate was cast. Cure was effected by heating at 60° C. for 12 hours, followed by a post cure at 100° C. for 6 hours. This product showed the following physical properties:

| | |
|---|---|
| Tensile strength _____ p.s.i__ | 7769 |
| Flexural strength _____ p.s.i__ | 13,685 |
| Heat distortion temperature, ° C. _____ | 94 |
| Hardness (Barcol) _____ | 36 |
| Water absorption: | |
| 4 hrs./100° C. _____ | 0.78 |
| 24 hrs./room temp. _____ | 0.10 |

Example V

In a one-liter, three-neck, round-bottom flask equipped with a mechanical stirrer, thermometer, and heating mantle, 795 grams (3 moles) of 2,2,4,4-tetrachloro-1,5-dihydroxy-3-pentanone, 299 grams (3 moles) of maleic anhydride, and 500 milliliters of tetrachloroethylene were charged and the mixture heated for 15 minutes to 46° C. at which time 8 milliliters of concentrated sulfuric acid were added. The mixture was then heated to reflux at 114° C. which required an additional period of about ½ hour. The reflux was continued for an additional 8½ hours, the temperature gradually increasing to 123° C. Over 80 milliliters of water were removed during reflux. The mixture was cooled to 65° C. and 50 grams of sodium bicarbonate added and stirred for 1 hour and filtered. The solvents and low-boiling components were removed by stripping at 2 millimeters of mercury pressure and 180° C. The residue was a dark, viscous liquid which became solid upon standing and which weighed 942 grams.

A quantity of this product (300 grams) was mixed with 300 grams of styrene to give a mixture containing 50 percent styrene. 3 grams of benzoyl peroxide were added and a plate was cast. Cure was effected by heating at 60° C. for 12 hours, followed by a post cure at 100° C. for 6 hours. This product showed the following physical properties:

| | |
|---|---|
| Tensile strength _____ p.s.i__ | 7851 |
| Flexural strength _____ p.s.i__ | 15,924 |
| Heat distortion temperature, ° C. _____ | 91.5 |

Example VI

In a one-liter, three-neck, round-bottom flask equipped with a mechanical stirrer, thermometer, and heating mantle, 530 grams (2 moles) of 2,2,4,4-tetrachloro-1,5-dihydroxy-3-pentanone, 196 grams (2 moles) of maleic anhydride, and 400 milliliters of perchloroethylene were charged, and the mixture heated to reflux at 95° C. which required a period of about 1 hour. 5 milliliters of concentrated sulfuric acid catalyst were then added and the reflux continued for an additional 3½ hours, the temperature gradually increasing to 124° C. 57 milliliters of water were removed during reflux. The mixture was cooled to 65° C., 30 grams of sodium bicarbonate added, stirred for 15 minutes, and stripped. The residue was a dark, viscous liquid which became solid upon standing and which weighed 609 grams. The theoretical amount is 697 grams.

A quantity of this product (300 grams) was mixed with 300 grams of styrene to give a mixture containing 50 percent styrene. 3 grams of benzoyl peroxide were added and a plate was cast. Cure was effected by heating at 60° C. for 12 hours, followed by a post cure at 100° C. for 6 hours. This product showed the following physical properties:

| | |
|---|---|
| Tensile strength _____ p.s.i__ | 5868 |
| Flexural strength _____ p.s.i__ | 12,613 |
| Heat distortion temperature, ° C. _____ | 92 |
| Hardness (Barcol) _____ | 28 |

Example VII

In a three-liter, three neck, round-bottom flask equipped with a mechanical stirrer, thermometer, and heating mantle, 795 grams (3 moles) of 2,2,4,4-tetrachloro 1,5-dihydroxy-3-pentanone, 250 grams (2.56 moles) of maleic anhydride, 57.6 grams (0.3 mole) of trimellitic anhydride, and 400 milliliters of perchloroethylene were charged and the mixture heated to reflux at 110° C. which required a period of about 1 hour. After heating for an additional hour, 5 milliliters of concentrated sulfuric acid catalyst were added and the reflux continued for an additional 6¾ hours with the temperature in the pot going as high as 121° C. 150 milliliters of water were removed during reflux. 30 grams of sodium bicarbonate were added and stirred for 30 minutes, followed by stripping at 4 millimeters of mercury pressure, the final temperature being 150° C. The residue was a dark, viscous liquid which became solid upon standing and which weighed 1007 grams giving a yield of 98 percent of theory. The molecular weight was 1207. This product was cross-linked with styrene producing a strong, hard resin.

It is to be understood that various changes and modifications may be made in the foregoing process and product without departing from the spirit of the invention and scope of the appended claims.

What is claimed is:

1. A polyester of maleic anhydride and 2,2,4,4-tetrachloro-1,5-dihydroxy-3-pentanone.

2. The polyester of claim 1 wherein said maleic anhydride and said 2,2,4,4 - tetrachloro - 1,5-dihydroxy-3-pentanone are in a molar ratio of about 1:2 to about 1:6.

3. The polyester of claim 1 wherein said polyester is a polyester of 2,2,4,4-tetrachloro-1,5-dihydroxy-3-pentanone and at least one organic dicarboxylic compound selected from the group consisting of dicarboxylic acid and anhydrides in addition to the maleic anhydride.

4. The polyester of claim 3 wherein said additional organic dicarboxylic compound is trimellitic anhydride.

5. A cross-linked polyester resin which is the reaction product of (1) a polyester of maleic anhydride and 2,2,4,4-tetrachloro-1,5-dihydroxy-3-pentanone, and (2) an ethylenically unsaturated cross-linking agent, said cross-linked polyester being characterized by relatively high order of nonflammability and chemical resistance.

6. The cross-linked polyester resin of claim 5 wherein said polyester (1) is cross-linked with about 20 to 70 percent by weight of styrene.

7. The cross-linked polyester resin of claim 5 wherein said maleic anhydride and said 2,2,4,4-tetrachloro-1,5-dihydroxy-3-pentanone are in a molar ratio of about 1:2 to about 1:6.

8. The cross-linked polyester resin of claim 5 wherein said polyeter (1) is a polyester of 2,2,4,4-tetrachloro-1,5-dihydroxy-3-pentanone and at least one organic dicarboxylic compound selected from the group consisting of dicarboxylic acid and anhydrides in addition to the maleic anhydride.

9. The cross-linked polyester resin of claim 8 wherein said additional organic dicarboxylic compound is trimellitic anhydride.

10. A process for preparing a polyester comprising heating and reacting maleic anhydride with 2,2,4,4-tetrachloro-1,5-dihydroxy-3-pentanone and separating the polyester from the product resulting from said reaction.

11. The process of claim 10 wherein said maleic anhydride and said 2,2,4,4-tetrachloro-1,5-dihydroxy-3-pentanone are reacted in a molar ratio of about 2:1 to about 1:6.

12. The process of claim 10 wherein at least one organic dicarboxylic compound selected from the group consisting of dicarboxylic acids and anhydrides is reacted with the 2,2,4,4-tetrachloro-1,5-dihydroxy-3-pentanone in addition to the maleic anhydride.

13. The process of claim 12 wherein said additional organic dicarboxylic compound is trimellitic anhydride.

14. A process for preparing a cross-linked polyester resin comprising reacting (1) a polyester of maleic anhydride and 2,2,4,4-tetrachloro-1,5-dihydroxy-3-pentanone, and (2) an ethylenically unsaturated cross-linking agent in the presence of a vinyl polymerization initiator.

15. A process for preparing the cross-linked polyester resin of claim 14 wherein said polyester (1) is cross-linked with about 20 to 70 percent by weight of styrene.

16. The process of claim 14 wherein said maleic anhydride and said 2,2,4,4-tetrachloro-1,5-dihydroxy-3-pentanone are reacted in a molar ratio of about 2:1 to about 1:6.

17. The process of claim 14 wherein at least one organic dicarboxylic compound selected from the group consisting of dicarboxylic acids and anhydrides is reacted with the 2,2,4,4-tetrachloro-1,5-dihydroxy-3-pentanone in addition to the maleic anhydride.

18. The process of claim 17 wherein said additional organic dicarboxylic compound is trimellitic anhydride.

References Cited

UNITED STATES PATENTS

| | | | |
|---|---|---|---|
| 2,335,434 | 11/1943 | Morey | 260—594 |
| 2,779,700 | 1/1957 | Robitschek et al. | 260—869 |

MURRAY TILLMAN, *Primary Examiner.*

J. T. GOOLKASIAN, *Assistant Examiner.*